(12) United States Patent
Perdrigeon et al.

(10) Patent No.: US 12,071,865 B2
(45) Date of Patent: Aug. 27, 2024

(54) AIR FLOW STRAIGHTENING STAGE FOR A TURBOMACHINE

(71) Applicant: SAFRAN AIRCRAFT ENGINES, Paris (FR)

(72) Inventors: Christophe Marcel Lucien Perdrigeon, Moissy-Cramayel (FR); Cédric Zaccardi, Moissy-Cramayel (FR); William Henri Joseph Riera, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/249,838

(22) PCT Filed: Oct. 20, 2021

(86) PCT No.: PCT/FR2021/051841
§ 371 (c)(1),
(2) Date: Apr. 20, 2023

(87) PCT Pub. No.: WO2022/084634
PCT Pub. Date: Apr. 28, 2022

(65) Prior Publication Data
US 2023/0383665 A1   Nov. 30, 2023

(30) Foreign Application Priority Data

Oct. 20, 2020   (FR) ...................................... 2010764

(51) Int. Cl.
*F01D 9/04*     (2006.01)
*F01D 25/24*    (2006.01)

(52) U.S. Cl.
CPC ............. *F01D 9/042* (2013.01); *F01D 25/24* (2013.01); *F05D 2250/71* (2013.01); *F05D 2260/30* (2013.01)

(58) Field of Classification Search
CPC ............................ F01D 9/042; F05D 2250/71
See application file for complete search history.

(56) References Cited

U.S. PATENT DOCUMENTS 3,745,629 A * 7/1973 Pask ........................ F01D 5/16
                                                    29/889.22
4,826,400 A * 5/1989 Gregory .................. F01D 5/141
                                                        415/181

(Continued)

FOREIGN PATENT DOCUMENTS

| EP | 0513958 A2 | 11/1992 |
| EP | 0513958 A3 | 11/1992 |

(Continued)

OTHER PUBLICATIONS

International Search Report mailed Feb. 22, 2022, issued in corresponding International Application No. PCT/FR2021/051841, filed Oct. 20, 2021, 2 pages.

(Continued)

*Primary Examiner* — Justin D Seabe
(74) *Attorney, Agent, or Firm* — Christensen O'Connor Johnson Kindness PLLC

(57) ABSTRACT

A bypass turbomachine is disclosed. The turbomachine includes a longitudinal axis having an upstream blower impeller and a downstream air-flow straightening assembly of a secondary annular passage delimited radially on the inside by a radially inner shroud and radially on the outside by a radially outer shroud, blades extending between the radially inner and outer shrouds and being attached at a first end portion to the radially inner shroud and at a second end portion to the radially outer shroud, the blades including a useful portion extending between the first and second end portions and defining a lower face and an upper face. For each blade, in a plane perpendicular to the longitudinal axis, (Continued)

each aerodynamically useful portion is bent into a C-shape in the circumferential direction.

14 Claims, 3 Drawing Sheets

(56) References Cited

U.S. PATENT DOCUMENTS

| | | | | |
|---|---|---|---|---|
| 6,821,087 B2* | 11/2004 | Matsumoto | ............. | F01D 9/042 |
| | | | | 416/241 A |
| 7,121,792 B1* | 10/2006 | Fessou | ................. | F04D 29/544 |
| | | | | 415/208.2 |
| 7,147,434 B2* | 12/2006 | Mons | ................... | F04D 29/542 |
| | | | | 29/889.22 |
| 2011/0164970 A1* | 7/2011 | Greim | .................... | F01D 9/041 |
| | | | | 415/208.1 |
| 2013/0094942 A1* | 4/2013 | MacKay | ................. | F01D 5/145 |
| | | | | 29/889.21 |
| 2017/0138371 A1* | 5/2017 | Lemarchand | ......... | F04D 29/542 |
| 2018/0080478 A1 | 3/2018 | Langenbrunner et al. | | |
| 2019/0120071 A1* | 4/2019 | Zaccardi | ................. | F01D 9/042 |

FOREIGN PATENT DOCUMENTS

| EP | 2093383 | 8/2009 |
|---|---|---|
| EP | 3473813 | 4/2019 |

OTHER PUBLICATIONS

Written Opinion of the International Searching Authority mailed Feb. 22, 2022, issued in corresponding International Application No. PCT/FR2021/051841, filed Oct. 20, 2021, 5 pages.

Rapport De Recherche Préliminaire / Opinion Écrite Sur La Brevetabilité De L'Invention dated Jul. 20, 2021, issued in corresponding French Application No. 2010764, filed Oct. 20, 2020, 6 pages.

* cited by examiner

AIR FLOW STRAIGHTENING STAGE FOR A TURBOMACHINE

TECHNICAL FIELD OF THE INVENTION

The present document relates to an airflow straightening stage for a turbine engine, and more particularly an airflow straightening assembly positioned downstream of a fan, in a secondary flow.

PRIOR ART

A bypass turbine engine comprises a fan whose outlet flow is split into a primary flow, directed towards the compressors, the combustion chamber then the turbines of the turbine engine, and a secondary flow ensuring a major portion of the thrust.

In order to limit the aerodynamic losses and therefore improve the thrust, it is necessary to straighten the secondary flow so that it flows, as much as possible in an axial direction.

For this purpose, turbine engines comprise straightening assemblies comprising fixed vanes commonly called OGV (acronym for Outlet Guide Vane) having a leading edge and a trailing edge between which extend an intrados face and an extrados face allowing straightening the airflow.

In order to reduce the mass of a turbine engine, some parts, usually metallic, are gradually being replaced by parts made of composite materials. This is particularly the case of the straightener stages which may be made of composite materials, since they are placed in the cold portions of the turbine engine, i.e. upstream of the combustion chamber or in the secondary flow path, and are therefore not subjected to significant heat.

The patent application WO 2014/076408, in the name of the Applicant, discloses, as represented in FIG. 1 of the present application, an assembly 10 for straightening an airflow of a turbine engine, comprising two coaxial respectively radially inner and outer shrouds 12, 14 between which extend stator vanes 16 fastened to a first end portion 18 on the radially inner shroud 12 and to a second end portion 20 on the radially outer shroud 14. The vanes 16 may be made of a composite material and comprise a useful portion 22 extending between the two end portions 18, 20 and defining an intrados face 21 and an extrados face 23 to straighten the air flow.

While such an assembly allows lightening the turbine engine, it is still perfectible.

Firstly, to save mass, the section of the vanes could be further reduced, nonetheless the forces to which the vanes are subjected in operation do not currently allow reducing the section of the vanes made of a composite material without generating an increased risk of disjoint of the layers of fibres making up the vanes. Secondly, the efficiency of the straightening assembly of the prior art is not optimum. Indeed, it has been possible to notice the formation of vortices in the vicinity of the extrados of the vanes, at the attachment of the vanes with the radially inner shroud, these vortices then generating turbulence in the airflow at the outlet of the straightening assembly which reduces the propulsion efficiency of the turbine engine.

Also, in operation, the straightening assembly is subjected to a torsional force around its axis which is applied on the inner shroud or the outer shroud, which tends to make the inner shroud rotate relative to the outer shroud. Therefore, a mere reduction in the mass of the vanes, and more particularly in their section, cannot increase their mechanical strength. Finally, fastening of the radial ends of the vanes to the inner and outer shrouds is problematic since they are made by means of a base substantially perpendicular to the vane, resulting in the formation of fragile areas at the junction of the bases with the vane. This problem also arises when the vane is made of a composite and when a disjoint should be made at the ends of the vanes for fastening these to the inner and outer shrouds.

SUMMARY OF THE INVENTION

The present document relates to a bypass turbine engine with a longitudinal axis comprising an upstream fan wheel and a downstream assembly for straightening an airflow from a secondary annular flow path delimited radially inwards by a radially inner shroud and radially outward by a radially outer shroud, vanes extending between the radially inner and outer shrouds and being fastened at a first end portion to the radially inner shroud and at a second end portion to the radially outer shroud, the vanes comprising an aerodynamically useful portion extending between said first and second end portions and defining an intrados face and an extrados face, characterised in that for each vane, in a plane perpendicular to the longitudinal axis, each useful portion is curved in the circumferential direction with a C-like shape.

The formation of a curved useful portion like in the technical suggestion of the present document, allows reducing the creation of vortices at the vane root, thereby contributing to the improvement of the efficiency of the turbine engine. Moreover, the connection of the useful portion with the first end portion, i.e. with the radially inner end portion, and with the second end portion, i.e. with the radially outer end portion, may be made without forming a 90° angle between the useful portion and the first and second end portions.

According to another feature, the first end portion and the second end portion do not extend inside the secondary annular flow path so as to avoid these end portions which ensure fastening of the straightening vanes affecting the airflow in the secondary annular flow path. For this purpose, the turbine engine may comprise a radially inner annular wall element and a radially outer annular wall element. The radially inner annular wall element and the radially outer annular wall element may be affixed and together define the secondary annular flow path. More specifically, the secondary annular flow path is delimited by the radially outer face of the radially inner annular wall element and by the radially inner face of the radially outer annular wall element.

Thus, the first end portion is arranged between the radially inner annular shroud and the radially inner annular wall element. Thus, the second end portion is arranged between the radially outer annular shroud and the radially outer annular wall element.

The radially inner annular wall element and the radially outer annular wall element may be split into sectors. They may comprise several aerodynamic platforms arranged circumferentially end-to-end and for example secured to the inner and outer annular shrouds.

Each aerodynamically useful portion is such that an intrados face or an extrados face is concavely curved and that respectively the extrados face or the intrados face is convexly curved, in the radial direction.

From an aerodynamics perspective, the vanes offer a larger surface area (compared to a radial vane) and with an interface angle with the inner shroud and the outer shroud which is close to zero, the losses are therefore less significant. The total number of vanes needed to straighten the flow is also less significant (because the overall aerodynamic surface area per vane is larger). This could lead to fewer vanes to be integrated with the intermediate casing, a decrease in the aerodynamic losses and a decrease in the total mass.

Conventionally, an end portion comprises a disjoint, i.e. two portions extending in opposite circumferential directions. According to the present document, the first end portion and the second end portion may be devoid of any disjoint and extend circumferentially in the continuation of the end of the useful portion to which they are connected. In other words, each end of a useful portion extends in the same first circumferential direction of the vane, the end portions extend the useful portion in this same first circumferential direction.

The end portions may be applied on the inner or outer shroud.

The angle between the radially inner or outer end of the useful portion and the inner or outer shroud may be much smaller than 90°, and for example comprised between 20 and 30°, which allows further reducing the vortices of the prior art.

In the case where the vanes are made of a composite, such as a ceramic matrix composite including ceramic fibres, the invention is particularly important since the formation of a large angle in the fibres which might cause aa break-up thereof is avoided.

The first end portion may comprise a plate for fastening to the inner shroud. The second end portion may comprise a plate for fastening to the outer shroud. Either one and/or both of the plates may comprise upstream and/or downstream radial edges.

Each plate may be crossed by screws for fastening to the inner or outer shroud.

The useful portion may comprise:
a first portion having a first mean radius of curvature;
a second portion having a second mean radius of curvature; and
a third portion having a third mean radius of curvature; the first mean radius of curvature and the third mean radius of curvature being larger than the second mean radius of curvature.

It is possible to have a second portion of the useful portion of the vane which is positioned radially in a substantially central manner between the inner and outer shrouds.

The first mean radius and the second mean radius may be identical.

The first end portion and the second end portion may be angularly offset with respect to each other.

DETAILED DESCRIPTION OF THE INVENTION

Figure 1:
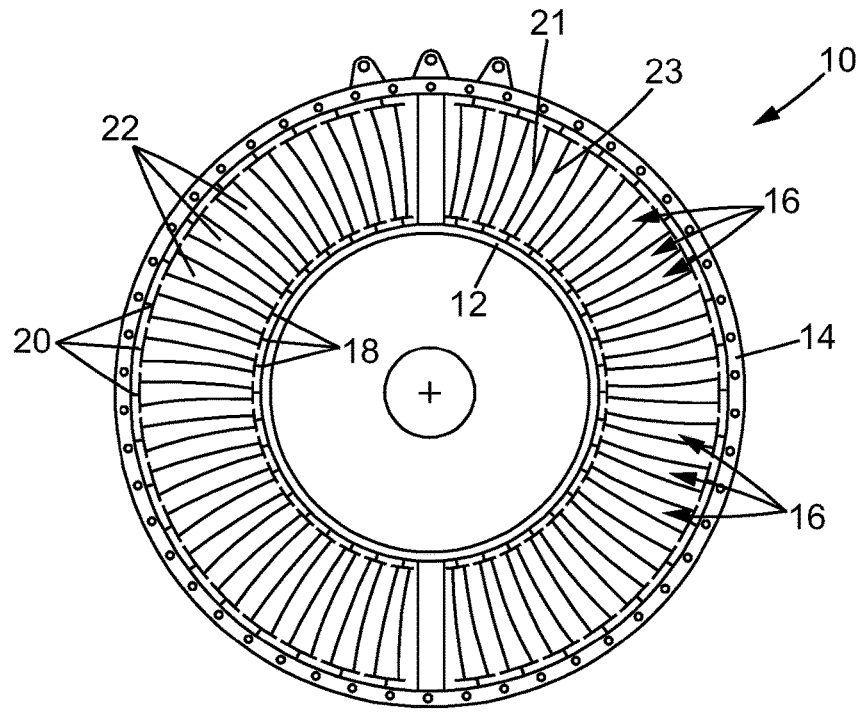
FIG. 1 is a schematic front view of a straightening assembly of the prior art.
Figure 2:
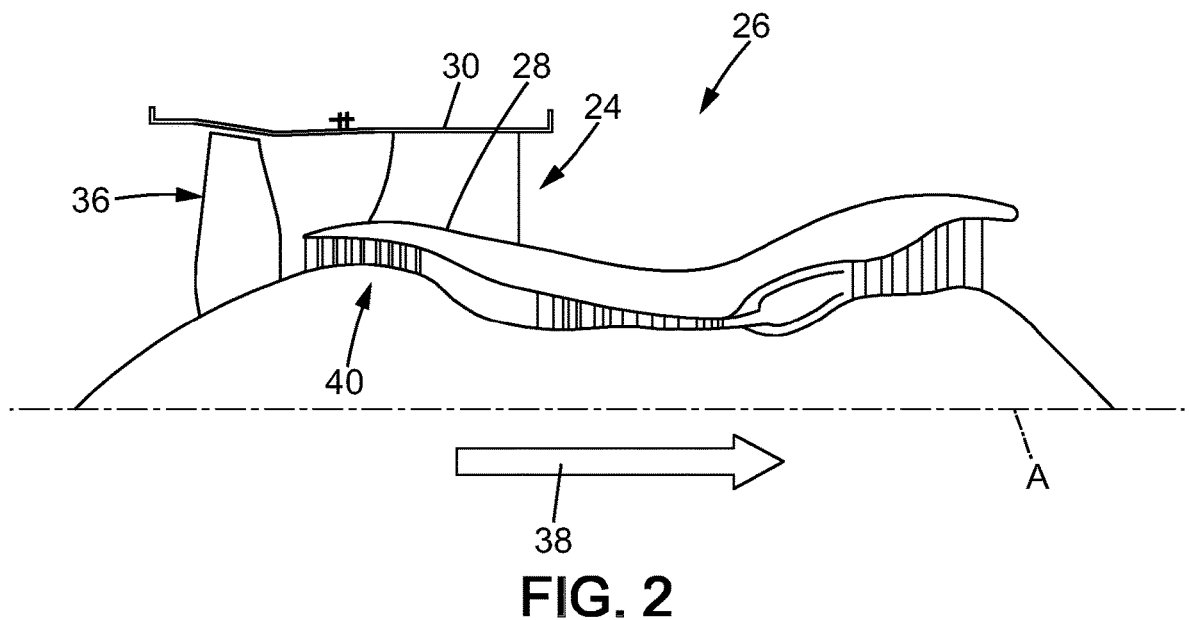
FIG. 2 is a simplified half-section of a turbine engine comprising a straightening assembly according to the invention.
Figure 3:
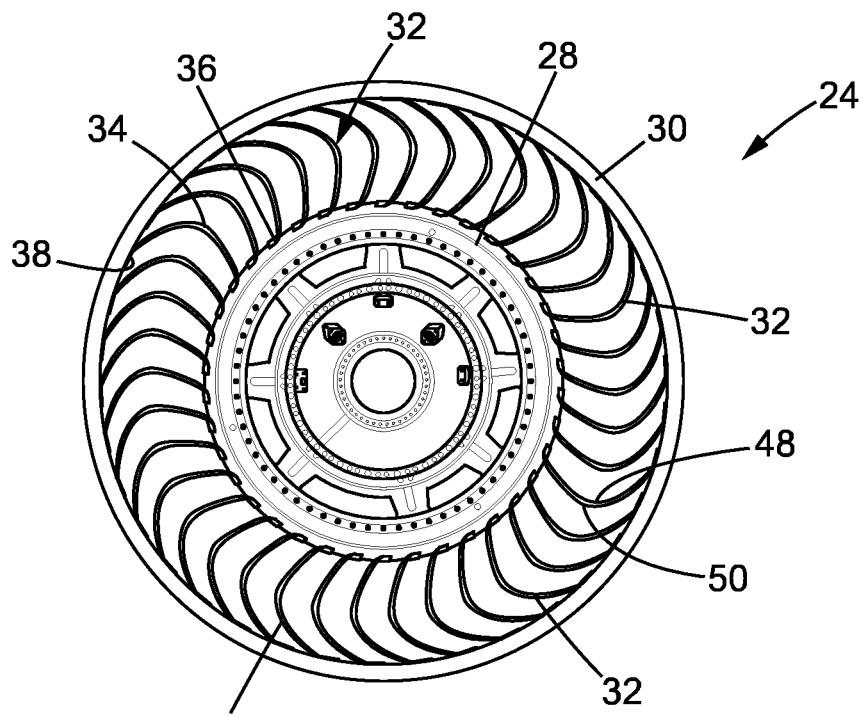
FIG. 3 is a schematic view of a straightener according to the present document.

In FIG. 2, a half-section of a turbine engine 26 is schematically represented comprising a straightening assembly 24 as illustrated in FIG. 3 which is intended to enable straightening of an airflow in a secondary air flow path of a turbine engine 26 viewed from the front.

This straightening assembly 24 comprises two coaxial radially inner and outer shrouds 28, 30, respectively, between which vanes 32 extend. Advantageously, the vanes 32 are made of a composite material so as to reduce the mass of the straightening assembly 24, while offering equivalent or greater mechanical strength.

As shown in FIG. 3, in a plane perpendicular to the longitudinal axis, the vanes 32 are curved in the circumferential direction with a C-like shape.

Figure 5:
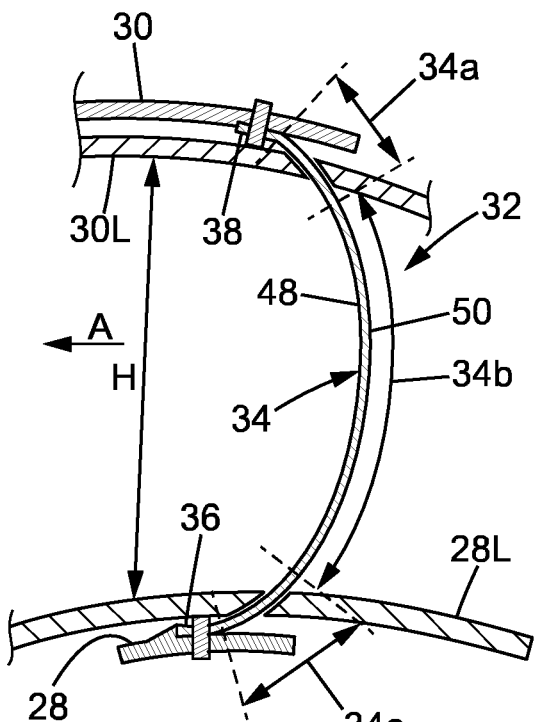
FIG. 5 is a schematic illustration of a vane according to the present document.

More specifically, as illustrated in FIG. 5, each vane 32 comprises an aerodynamically useful portion 34 curved circumferentially with a C-like shape, this useful portion is connected at its radially inner end to a first end portion 36 and at its radially outer end to a second end portion 38. This C-like shape allows increasing the aerodynamic surface of each vane 32 allowing considering reducing the total number of vanes 32 thereby possibly resulting in a reduction in the mass of the straightener 24. Moreover, the use of a curved useful portion allows considerably reducing the formation of vortices in the vicinity of the extrados of the vanes, at the attachment of the vanes with the radially inner shroud 28. A useful portion or aerodynamically useful portion of the vane is a portion that ensures an aerodynamic function with regards to the airflow and in this case which ensures straightening of the airflow coming from the fan arranged upstream. Conversely, the first end portion and the second end portion ensure no aerodynamic function on the airflow. They do not contribute to straightening of the airflow. The C-like shape is such that the intrados face is concavely curved and the extrados face is convexly curved. It should be noted that in another configuration, the reverse would also be possible. Nonetheless, the first configuration is more advantageous on the reduction of the vortices at the radially inner and outer ends under some conditions. It should be noted that the C-like shape makes the flow rate distribution vary over the height, therefore depending on the configurations, it might be interesting to have either one to limit the load on the vane profiles at mid-height or else to increase it and therefore limit the load at the root and tip of the vane.

Figure 4:
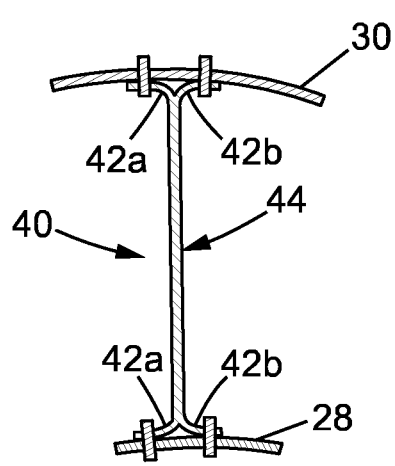
FIG. 4 is a schematic illustration of a vane according to the prior art.

As illustrated in FIG. 4, a conventional radial vane 40 made of a composite with a ceramic matrix and fibres comprises a disjoint at the end portions, i.e. two portions 42a, 42b extending in opposite circumferential directions in order to achieve fastening of the aerodynamically useful portion 44 of the vane 42 to the inner shroud 28 and the outer shroud 30.

According to an embodiment of a vane 32 as illustrated in FIG. 5, the first end portion 36 and the second end portion 38 connected to the aerodynamically useful portion 34 of the vane 32 made of a composite material may be devoid of any disjoint and extend circumferentially in the same circumferential direction (arrow A) as the end of the useful portion 34 to which they are connected. Thus, each end of a useful portion 34 extends in the same first circumferential direction (arrow A), the end portions 36, 38 extend the useful portion 34 in this same first circumferential direction (arrow A).

In a particular embodiment, the useful portion 34 may comprise:

a first portion 34a having a first mean radius of curvature;
a second portion 34b having a second mean radius of curvature; and
a third portion 34c having a third mean radius of curvature;
the first mean radius of curvature and the third mean radius of curvature being larger than the second mean radius of curvature. It would be possible to have a second portion 34b of the useful portion of the vane that is positioned radially in a substantially central manner between the inner 28 and outer 30 shrouds. In the case illustrated in FIG. 5, the first mean radius of curvature and the second mean radius of curvature are identical.

The first end portion 36 and the second end portion 38 may be angularly offset with respect to each other as shown in FIG. 3 and FIG. 5.

The first end portion 36 and the second end portion 38 may be substantially planar and each be applied on the inner and outer shrouds respectively.

Figure 6:
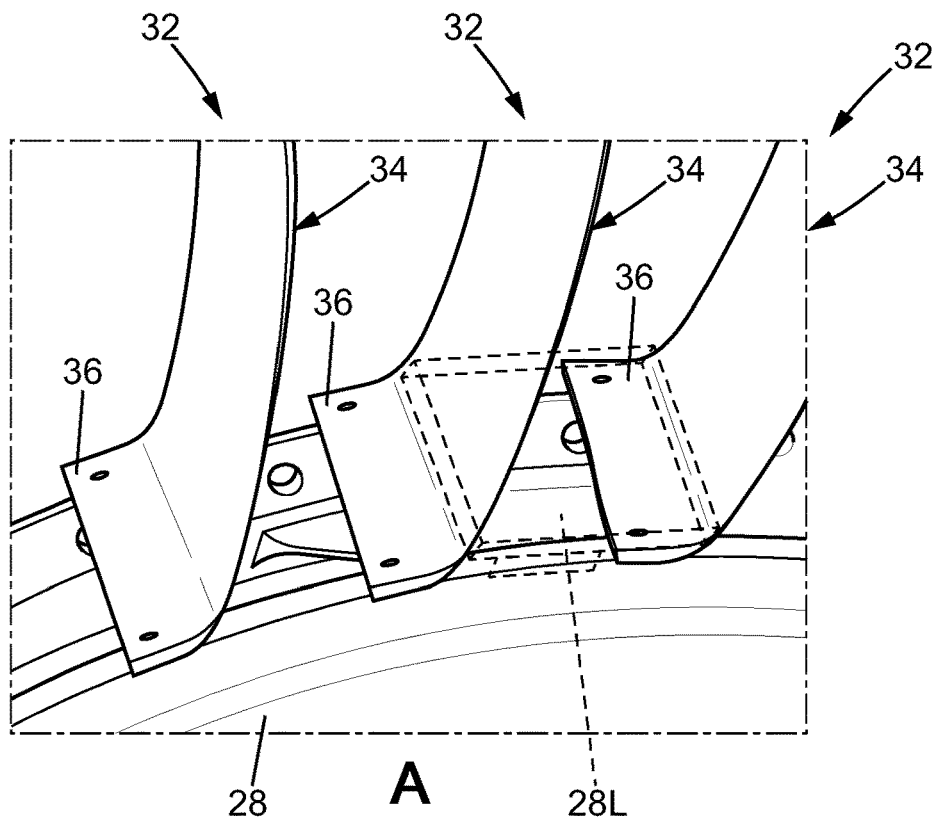
FIG. 6 illustrates in the part A the connection of the vane to an inner shroud and in the part B the connection of the vane to an outer shroud.
Figure 6:
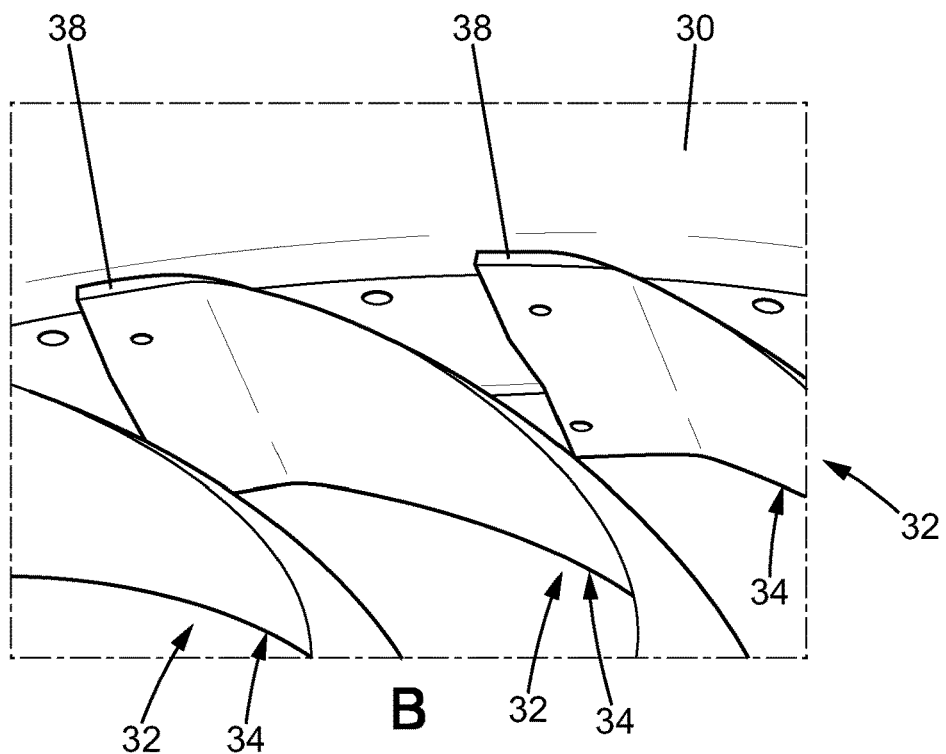

The first end portion 36 and the second end portion 38 are in the form of a plate for fastening to the inner shroud 28 and the outer shroud 30 as illustrated in FIGS. 6A and 6B. These plates may be substantially planar. In this configuration, the connection of a plate with a radially inner or outer end of the useful portion is made with an angle which is comprised between 20 and 30°.

As one could observe in FIG. 5, each plate comprises upstream and downstream radial rims 42 enabling the axial positioning of the vane 32 on the inner 28 and outer 30 shrouds.

Each plate is crossed by screws for fastening to the inner 28 or outer 30 shroud.

In the different represented embodiments, it is observed that the first end portion and the second end portion do not extend inside the secondary annular flow path so as to avoid these end portions which ensure fastening of the straightening vanes affecting the airflow in the secondary annular flow path.

Indeed, as illustrated in FIGS. 5 and 6A, the straightening assembly may comprise a radially inner annular wall element 28L and a radially outer annular wall element 30L. The radially inner annular wall element 28L and the radially outer annular wall element 30L may be affixed and together define the secondary annular flow path in which the air flows. More specifically, the secondary annular flow path with a height H is delimited by the radially outer face of the radially inner annular wall element 28L and by the radially inner face of the radially outer annular wall element 30L.

Thus, the first end portion 36 is arranged between the radially inner annular shroud 28 and the radially inner annular wall element 28L. Thus, the second end portion 38 is arranged between the radially outer annular shroud 30 and the radially outer annular wall element 30L.

The radially inner annular wall element 28L and the radially outer annular wall element 30L may be split into sectors. They may comprise several aerodynamic platforms arranged circumferentially end-to-end and for example secured to the inner 28 and outer 30 annular shrouds.

Each annular platform may comprise an upstream lateral lug and a downstream lateral lug for fastening on the inner 28 or outer 30 annular shroud.

The invention claimed is:

1. A bypass turbine engine with a longitudinal axis, the turbine engine comprising:
   an upstream fan wheel; and
   a downstream assembly for straightening an airflow from a secondary annular flow path delimited radially inwardly by a radially inner annular wall element and delimited radially outwardly by a radially outer annular wall element,
   wherein the downstream assembly includes a radially inner shroud disposed radially inwardly of the radially inner annular wall element, a radially outer shroud disposed radially outwardly of the radially outer annular wall element, and vanes extending between the radially inner and outer shrouds and being fastened at a first end portion to the radially inner shroud and at a second end portion to the radially outer shroud, the first end portions being disposed in-between the radially inner annular wall element and the radially inner shroud and the second end portions being disposed in-between the radially outer annular wall element and the radially outer shroud, and
   wherein the vanes comprising an aerodynamically useful portion extending between said first and second end portions and defining an intrados face and an extrados face, wherein for each vane, in a plane perpendicular to the longitudinal axis, each aerodynamically useful portion is curved in the circumferential direction with a C-like shape.

2. The turbine engine according to claim 1, wherein the C-like shape is such that the intrados face is concavely curved and the extrados face is convexly curved.

3. The turbine engine according to claim 1, wherein the first end portion and the second end portion are devoid of any disjoint and extend circumferentially in the same direction as the end of the aerodynamically useful portion to which they are connected.

4. The turbine engine according to claim 1, wherein the first end portion comprises a plate for fastening to the inner shroud.

5. The turbine engine according to one of claim 1, wherein the second end portion comprises a plate for fastening to the outer shroud.

6. The turbine engine according to claim 4, wherein the plate is crossed by screws for fastening to the inner shroud.

7. The turbine engine according to claim 1, wherein the aerodynamically useful portion comprises:
   a first portion having a first mean radius of curvature;
   a second portion having a second mean radius of curvature; and
   a third portion having a third mean radius of curvature;
   the first mean radius of curvature and the third mean radius of curvature being larger than the second mean radius of curvature.

8. The turbine engine according to claim 1, wherein the aerodynamically useful portion comprises:
   a first portion having a first mean radius of curvature;
   a second portion having a second mean radius of curvature; and
   a third portion having a third mean radius of curvature:
   the first mean radius of curvature and the second mean radius of curvature being identical.

9. The turbine engine according to one of claim 1, wherein the first end portion and the second end portion are angularly offset with respect to each other.

10. The turbine engine according to claim 5, wherein the plate is crossed by screws for fastening to the outer shroud.

11. The turbine engine according to claim 7, wherein the second portion is positioned radially in a substantially central manner between the inner shroud and the outer shroud.

12. The turbine engine according to claim 8, wherein the second portion is positioned radially in a substantially central manner between the inner shroud and the outer shroud.

13. The turbine engine according to claim 7, wherein the radially inner annular wall element and the radially outer annular wall element each comprising a number of sectors, and wherein the first portion of each vane extends in-between adjacent sectors of the radially inner annular wall element and the third portion of each vane extends in-between adjacent sectors of the radially outer annular wall element.

14. The turbine engine according to claim 8, wherein the radially inner annular wall element and the radially outer annular wall element each comprising a number of sectors, and wherein the first portion of each vane extends in-between adjacent sectors of the radially inner annular wall element and the third portion of each vane extends in-between adjacent sectors of the radially outer annular wall element.

\* \* \* \* \*